United States Patent [19]

Connelly

[11] 4,300,613
[45] Nov. 17, 1981

[54] SAFETY TIRE HAVING PNEUMATIC TIRE SUPERIMPOSED ON ANNULAR CUSHION

[76] Inventor: Jerald L. Connelly, 2201 Hercules Dr., Colorado Springs, Colo. 80906

[21] Appl. No.: 139,801

[22] Filed: Apr. 14, 1980

[51] Int. Cl.³ ............... B60C 17/00; B60C 11/02
[52] U.S. Cl. ........................ 152/159; 152/175; 152/187; 152/303; 152/343
[58] Field of Search .................. 152/151–152, 152/155, 157–158, 159, 161–164, 165–166, 300–303, 312, 310, 315, 322, 327–329, 343–344, 175, 187

[56] References Cited

U.S. PATENT DOCUMENTS

| 587,244 | 7/1897 | Snow | 152/158 |
| 1,336,790 | 4/1920 | Simms | 152/302 |
| 3,004,575 | 10/1961 | Morse | 152/175 |

Primary Examiner—Edward C. Kimlin
Assistant Examiner—Lois E. Boland
Attorney, Agent, or Firm—Richard W. Hanes

[57] ABSTRACT

The present invention relates to a vehicle tire having a continuous solid elastic annularly shaped cushion for encircling a vehicle wheel and an inflatable tubeless tire mounted around the outside periphery of the cushion.

1 Claim, 3 Drawing Figures

U.S. Patent    Nov. 17, 1981    4,300,613
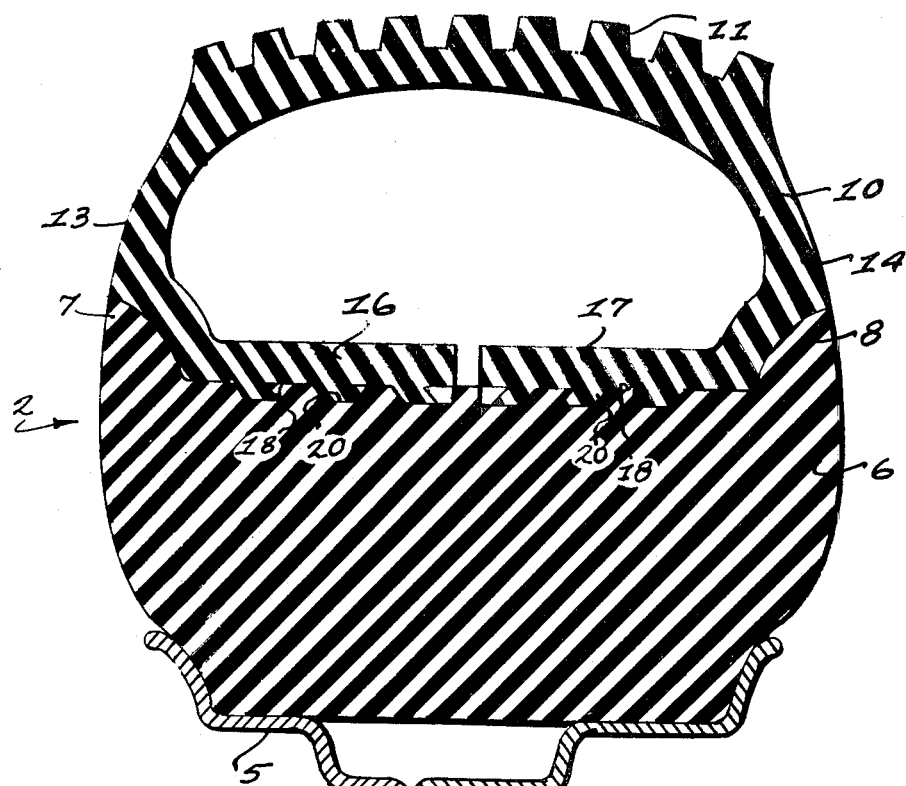
Fig.1
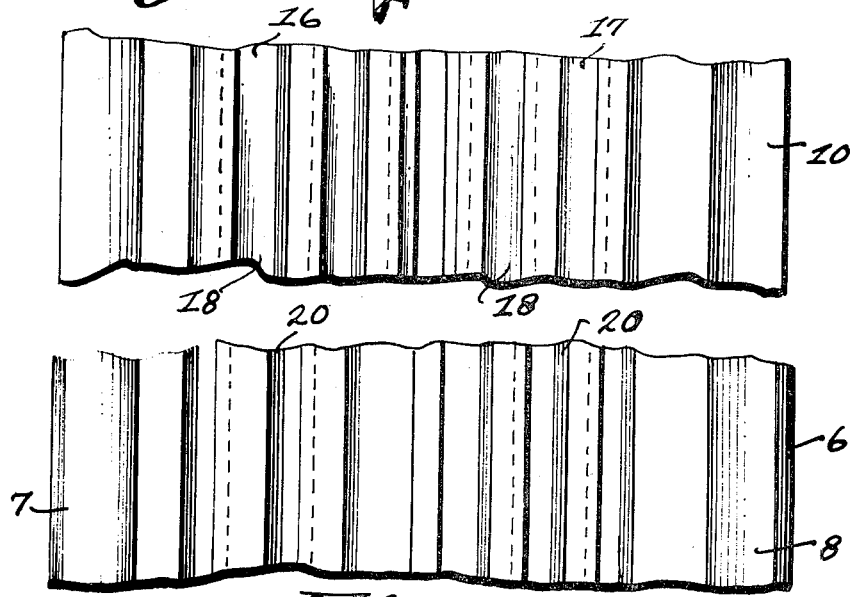
Fig.2
Fig.3

SAFETY TIRE HAVING PNEUMATIC TIRE SUPERIMPOSED ON ANNULAR CUSHION

BACKGROUND OF THE INVENTION

Most pneumatic vehicle tires suffer from dramatic changes in their characteristics when suddenly deflated. Loss of control of the flattened tire is accompanied by greatly reduced wheel diameter and reduced braking ability. The problem has been recognized since pneumatic tires were conceived but for a variety of reasons the proposed solutions to the problem have failed to be incorporated into production vehicle tires. Both metal and rubber buffers bearing on the base of the rim have been tried as well as air tires inside of tires. These methods have proved expensive and difficult to install. Prior U.S. Patents which illustrate the prior art include U.S. Pat. Nos. 638,590; 730,474; 2,989,108; 2,713,373; 3,610,308; 3,250,310; and, 3,949,796.

The primary object of the present invention is to provide a cushion tire which has inherent blowout safety features and will not deflate to the wheel rim.

Another object of the invention is to provide such a pneumatic tire which substantially maintains its shape and size after deflation to sustain proper braking and control.

A further object of the invention is to provide a pneumatic tire construction which has the foregoing stated advantages, but is economical to manufacture and is without the inherent disadvantages of buffers and tires within tires.

Still other and further objects, features and advantages of the tire construction of the present invention will be apparent upon a reading of the following detailed description of a preferred form of the invention taken in connection with the accompanying drawing.

DESCRIPTION OF THE DRAWINGS

FIG. 1 is a fragmentary cross sectional view of a drop center wheel rim having mounted thereon an annular cushion and a surrounding inflatable pneumatic tubeless tire which together comprise the vehicle tire of the present invention.

FIG. 2 is a fragmentary view of the inside diameter coupling surface of the inflatable tubeless tire portion of the vehicle tire of the present invention.

FIG. 3 is a fragmentary view of the peripheral surface of the solid elastic inner cushion member of the vehicle tire of the present invention.

DETAILED DESCRIPTION OF THE INVENTION

A cross sectional view of a tire 2 according to the present invention is shown in FIG. 1. A standard design vehicle wheel 4 has a split tire mounting drop center rim 5 around its outside circumference upon which is mounted a solid elastic (such as rubber) cushion 6. The cushion's inside diameter is sized and shaped to fit the contour of the rim while the outside diameter of the cushion 6 is shaped somewhat like a wheel rim itself, that is with a substantially flat mid portion and raised outer edges 7 and 8.

A pneumatic tire 10 is mounted on the cushion rim. The tire 10 is of substantially standard construction except for the depth of the tire and the size of the air compartment. These dimensions are reduced so as to make the combination of the cushion 6 and tire 10 of size and shape similar to a standard vehicle tire.

The lower portion of the side walls 13 and 14 of the tire 10 are turned inwardly at their inside extremity to provide a pair of laterally spaced apart coupling members 16 and 17 which conform with and fit axially inside the raised outer edges 7 and 8 and which mesh with a cooperating mid portion of the cushion 6. Grooves 18 on the inside diameter of the split coupling sections 16 and 17 of the tire 10 are slanted in opposite directions on each side of the space between the tire coupling surfaces and engage similarly slanted meshing ridges 20 in the mid portion of the outside diameter of the cushion 6.

It will be seen from the tire construction of this invention that any deflation of the pneumatic tire will not allow the wheel 2 to come into contact with the road surface. The cushion 6 will take the load and respond to braking and provide for control of the wheel.

In addition to providing blowout protection the cushion 6 acts as a buffer against wheel damage which might otherwise result from the striking of road hole edges or other sharp objects.

The tire 10 may as easily be installed on the cushion 6 as any normal pneumatic tire is mounted on a metal wheel rim.

I claim:

1. Combination solid and pneumatic tire for mounting on the rim of a vehicle wheel comprising:
   a solid annularly shaped elastic cushion adapted to be mounted on and carried by the rim of a vehicle wheel, said cushion having at its outer periphery a pair of raised outer edges and a substantially flat circumferential midportion between said raised outer edges and wherein the said midportion has a plurality of grooves and ridges;
   an inflatable tubeless tire casing having:
   a tread surface,
   a pair of side walls depending from the tread surface and each of said side walls having axially inwardly directed extensions providing a pair of laterally spaced apart coupling members which conform with and fit axially inside the said raised outer edges and which coupling members contain grooves and ridges to mutually mesh with the grooves and ridges in the midportion of the annular cushion.

* * * * *